United States Patent
Bulat et al.

(10) Patent No.: US 10,753,276 B2
(45) Date of Patent: Aug. 25, 2020

(54) GAS TURBINE SYSTEM

(71) Applicant: SIEMENS AKTIENGESELLSCHAFT, Munich (DE)

(72) Inventors: Ghenadie Bulat, Lincoln (GB); Timothy Hughes, Wantage (GB); Jonathan May, Lincoln (GB); Ian Wilkinson, Witney (GB)

(73) Assignee: Siemens Aktiengesellschaft, Munich (DE)

( * ) Notice: Subject to any disclaimer, the term of this patent is extended or adjusted under 35 U.S.C. 154(b) by 240 days.

(21) Appl. No.: 15/777,486

(22) PCT Filed: Nov. 2, 2016

(86) PCT No.: PCT/EP2016/076453
§ 371 (c)(1),
(2) Date: May 18, 2018

(87) PCT Pub. No.: WO2017/084876
PCT Pub. Date: May 26, 2017

(65) Prior Publication Data
US 2018/0355794 A1 Dec. 13, 2018

(30) Foreign Application Priority Data

Nov. 20, 2015 (GB) .................................. 1520612.1

(51) Int. Cl.
*F02C 1/00* (2006.01)
*F02C 3/22* (2006.01)
(Continued)

(52) U.S. Cl.
CPC ............. *F02C 3/22* (2013.01); *C01B 3/047* (2013.01); *F02C 3/28* (2013.01); *F02C 6/003* (2013.01);
(Continued)

(58) Field of Classification Search
CPC ........ F02C 3/20; F02C 3/28; F02C 3/22; F23C 13/04; F23R 3/40; F23R 2900/03341
See application file for complete search history.

(56) References Cited

U.S. PATENT DOCUMENTS 3,313,103 A * 4/1967 Johnson .................... F02C 3/20
60/776
2005/0037244 A1 2/2005 Goetsch et al.
(Continued)

FOREIGN PATENT DOCUMENTS

CN 101538010 A 9/2009
CN 103375306 A 10/2013
(Continued)

OTHER PUBLICATIONS

Office Action dated Mar. 18, 2020 for Chinese Patent Application No. 202003130166 7300.

*Primary Examiner* — Gerald L Sung
(74) *Attorney, Agent, or Firm* — Schiff Hardin LLP

(57) ABSTRACT

A gas turbine system has a source of ammonia and a source of an oxygen-containing gas, a first combustion chamber connected to receive ammonia, a hydrogen-rich gas stream and oxygen-containing gas, a turbine connected to receive an exhaust gas stream from the first combustion chamber; and a second combustion chamber connected to receive an exhaust gas from the turbine, ammonia and a hydrogen-rich gas stream.

10 Claims, 1 Drawing Sheet

(51) Int. Cl.
*C01B 3/04* (2006.01)
*F02C 6/00* (2006.01)
*F02C 3/28* (2006.01)

(52) U.S. Cl.
CPC .. *C01B 2203/1614* (2013.01); *C01B 2203/84* (2013.01); *F05D 2220/70* (2013.01); *Y02E 60/364* (2013.01)

(56) References Cited

U.S. PATENT DOCUMENTS

| | | | |
|---|---|---|---|
| 2009/0133400 A1* | 5/2009 | Callas | F02C 7/143 60/730 |
| 2011/0283960 A1 | 11/2011 | Hikazudani et al. | |
| 2012/0047870 A1* | 3/2012 | Kasuga | F02C 3/22 60/39.462 |
| 2018/0187883 A1 | 7/2018 | Bulat et al. | |

FOREIGN PATENT DOCUMENTS

| | | |
|---|---|---|
| GB | 1 534 891 A | 12/1978 |
| GB | 2539667 | 12/2016 |
| JP | 2948351 B2 | 9/1999 |
| JP | 2012255420 A | 12/2012 |
| JP | 2014095370 A | 5/2014 |
| JP | 2015031215 A | 2/2015 |
| JP | 2015190466 A | 11/2015 |
| WO | WO-2006/117531 A1 | 11/2006 |

* cited by examiner

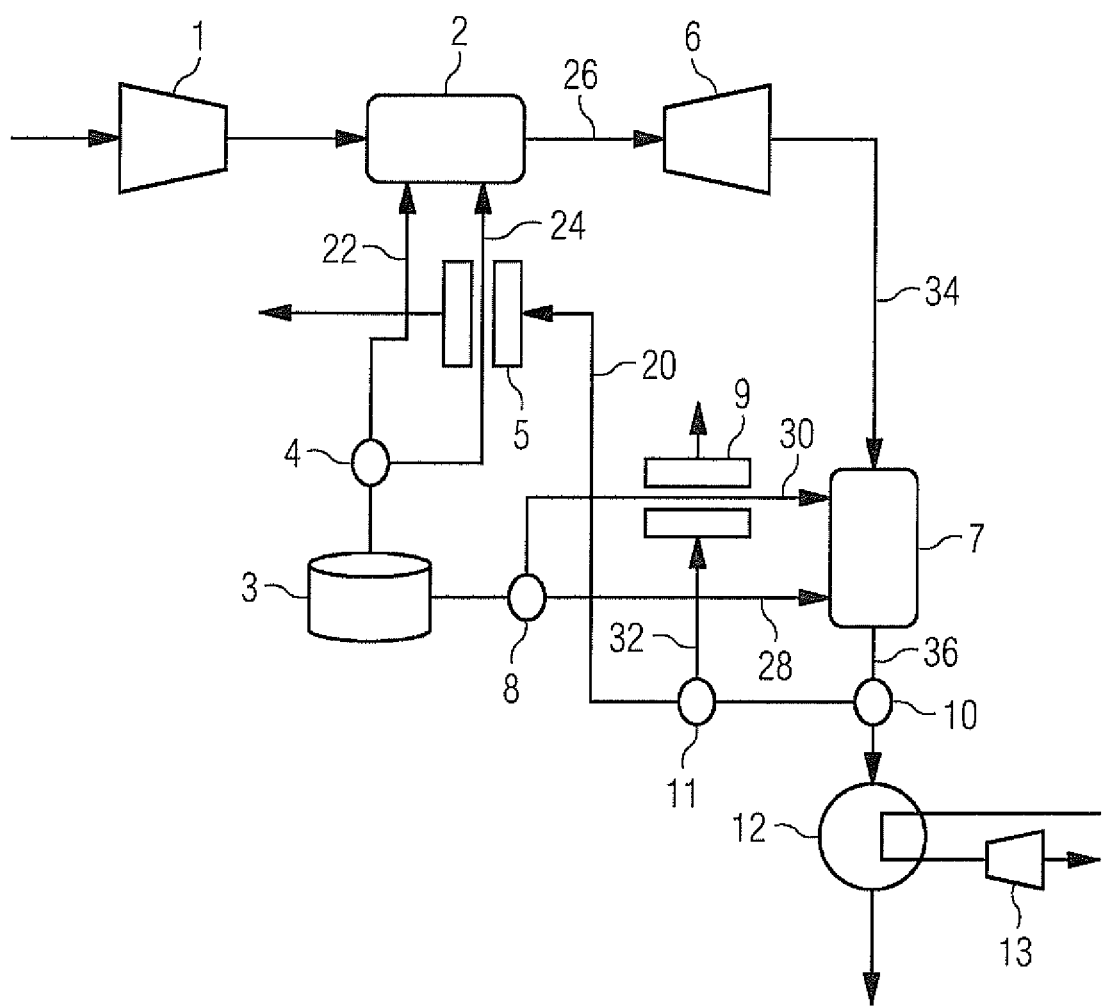

GAS TURBINE SYSTEM

BACKGROUND OF THE INVENTION

Field of the Invention

The present invention relates to combustion of ammonia to release energy. In particular, the invention relates to operation of a gas turbine, fuelled by combustion of ammonia.

Description of the Prior Art

Known procedures for release of energy from ammonia by combustion of the ammonia require supply of ammonia, an oxygen-containing gas and hydrogen. The supply and storage of hydrogen is expensive and raises safety concerns, and the present invention avoids the need to store hydrogen gas. It is preferred to operate the procedure for release of energy from ammonia as efficiently as possible, with minimum waste of energy. It is preferred that no external heat sources or energy sources are required to operate the procedure for combustion of ammonia.

SUMMARY OF THE INVENTION

The present invention provides a gas turbine system having a source of ammonia and a source of an oxygen-containing gas, and a first combustion chamber connected to receive three gas streams: ammonia, a hydrogen-rich gas stream and oxygen-containing gas, and a turbine connected to receive an exhaust gas stream from the first combustion chamber. The gas turbine system according to the invention also has a second combustion chamber connected to receive three gas streams: an exhaust gas from the turbine, ammonia and a hydrogen-rich gas stream.

The gas turbine system may further have a first cracker chamber that receives ammonia from the ammonia source and to supply a hydrogen-rich gas stream to the first combustion chamber. This hydrogen-rich gas stream supplies the hydrogen required for combustion of ammonia without the need to provide and store hydrogen.

The gas turbine system may further have a second cracker chamber arranged to receive ammonia from the ammonia source and to supply a hydrogen-rich gas stream to the second combustion chamber. This hydrogen-rich gas stream supplies the hydrogen required for combustion of ammonia without the need to provide and store hydrogen.

A temperature of the, or each, cracker chamber may regulated by mass control of a flow of exhaust gas from the second combustion chamber. This provides temperature control without the need for an external heating source.

The gas turbine system may further have a heat exchanger arranged to receive exhaust gas from the second combustion chamber. A steam turbine may be provided, operated by heat derived from the heat exchanger.

The present invention also provides a method for combustion of ammonia, including the steps of providing an oxygen-containing gas to a first combustion chamber, providing ammonia to the first combustion chamber; providing a hydrogen-rich gas to the first combustion chamber, performing a first combustion in the first combustion chamber, supplying an exhaust gas from the first combustion chamber to a second combustion chamber, supplying ammonia to the second combustion chamber, supplying a hydrogen-rich gas to the second combustion chamber; and performing a second combustion in the second combustion chamber with an enhanced equivalence ratio. Equivalence ratio in context is the stoichiometric ratio.

The hydrogen-rich gas supplied to the first combustion chamber is generated by cracking of ammonia.

The hydrogen-rich gas supplied to the second combustion chamber may be generated by cracking of ammonia.

The cracking may be carried out at an elevated temperature, the elevated temperature being provided by a flow of exhaust gas from the second combustion chamber.

The method may further include the step of removing waste heat from exhaust gas stream from the second combustion chamber and recovering energy.

The invention also provides a method for extracting energy from ammonia, including performing combustion of ammonia, and including the step of connecting a turbine to receive the exhaust gas from the first combustion chamber and providing exhaust gas from the turbine to the second combustion chamber, the flow of gas through the turbine generating a mechanical output.

BRIEF DESCRIPTION OF THE DRAWINGS

The single FIGURE schematically illustrates an embodiment of the present invention.

DESCRIPTION OF THE PREFERRED EMBODIMENTS

The FIGURE shows a gas turbine system according to an exemplary embodiment of the present invention, which includes optional features in addition to the essential features described below.

In the illustrated embodiment, the gas turbine system comprises a source such as compressor 1 which provides an oxygen-containing gas such as air and passes it into a first combustion chamber 2. Ammonia 3 passes through a calibrated mass flow separator 4 where a portion of the mass flow is passed directly to the first combustion chamber 2 and a second portion is passed to a cracker chamber 5. The cracker chamber 5 contains a catalyst (Ru, Rh, Pt, Pd or similar) that promotes the decomposition of ammonia $NH_3$ into a hydrogen-rich gas mixture containing nitrogen, hydrogen and other constituents. The degree of decomposition is controlled by varying the temperature of the ammonia and the catalyst. Elevated temperatures of ammonia and catalyst may be achieved by heat exchange with an exhaust gas flow 20 from a second combustion chamber 7, to be described below. The elevated temperature may be controlled by varying the mass flow of ammonia through the heat exchanger and mass flow of the exhaust gas 20 through the catalyst bed of the first cracker chamber.

Ammonia stream 22 and hydrogen-rich stream 24 are injected into first combustion chamber 2 where combustion takes place producing heat and an exhaust gas flow 26. Due to incomplete combustion of the ammonia ($NH_3$) the exhaust gas flow will have high levels of $NO_x$. The exhaust gas flow 26 is supplied to a turbine 6 where work is transferred to a shaft or similar, to produce a mechanical output.

The exhaust gas flow 26 leaving the turbine is hot and is routed to a second combustion chamber 7. Ammonia 3 is flowed into a second calibrated flow separator 8 where a portion of the mass flow of ammonia is passed directly to the second combustion chamber 7 as an ammonia stream 28. A second portion is passed to a second cracker chamber 9. The cracker chamber 9 contains a catalyst (Ru, Rh, Pt, Pd or similar) that promotes the decomposition of $NH_3$ into nitrogen, hydrogen and other constituents into a hydrogen-rich stream 30. The degree of decomposition is controlled by varying the temperature of the gases and catalyst within the second cracker chamber 9. Elevated temperature in the second cracker chamber 9 may be achieved by heat exchange with an exhaust gas flow 32 from the second combustion chamber 7. The temperature may be controlled by varying the mass flow of exhaust gas flow 32 through the heat exchanger and mass flow of ammonia through the catalyst bed of the cracker chamber.

The ammonia stream 28 and the hydrogen-rich stream 30 are injected into the second combustion chamber 7 where they are combusted. The combustion in the second combustion chamber is performed with an enhanced equivalence ratio typically 1.0-1.2, meaning that an excess of ammonia is present. The enhanced ratio ensures that the combustion produces a significant proportion of $NH_2$-ions. These $NH_2$-ions combine with the $NO_x$ in the exhaust stream 34 from the turbine 6 to produce $N_2$ and $H_2O$, thereby removing the $NO_x$ from the exhaust stream.

The exhaust gas 36 from the 2nd combustion chamber 7 flows through a calibrated flow separator 10 so that a portion of the mass flow is routed to another calibrated flow separator 11. By control of calibrated flow separators 10 and 11, mass flow is manipulated so that the first and second cracker chambers 5 and 9 are at the required temperatures.

Preferably, a heat exchanger loop 12 is used to remove waste heat from exhaust stream 36 and recover energy, for example by boiling water to rotate a steam turbine 13.

The invention accordingly provides an ammonia-powered turbine, allowing energy stored as ammonia to be recovered into a mechanical output at turbine 6.

By use of dual combustion chambers, nitrogen oxides NOx are removed from the exhaust stream. Combustion in the second combustion chamber is performed at an appropriate equivalence ratio to allow the formation of $NH_2$-ions, which combine with NOx in the exhaust gas from the first combustion chamber. The equivalence ratio may be achieved by appropriate selection and control of the temperature of cracker chambers 5, 9. The temperature of the cracker chambers may in turn be controlled by controlling the flow of an exhaust gas.

The process is energy efficient in that the required heating of cracking chambers to generate a hydrogen-rich stream from ammonia is provided by an exhaust stream from ammonia combustion. This avoids the need for separate provision and storage of a heating source such as hydrogen gas, or provision of heating by other means such as electrical heating.

Energy present in the temperature of final exhaust gas may be recovered into mechanical output by operation of a steam turbine or other energy-recovery arrangements.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A gas turbine system comprising:
   an ammonia source and an oxygen-containing gas source;
   a first combustion chamber connected to receive a first ammonia gas stream, a first hydrogen-comprising gas stream, and an oxygen-containing gas stream;
   a first turbine connected to receive a first exhaust gas stream from the first combustion chamber;
   a second combustion chamber connected to receive a second exhaust gas stream from the first turbine, a second ammonia gas stream, and a second hydrogen-comprising gas stream;
   said ammonia source connected to the first combustion chamber to provide the first ammonia gas stream to the first combustion chamber;
   said ammonia source also connected to the second combustion chamber to provide the second ammonia gas stream to the second combustion chamber; and
   a first cracker chamber arranged to receive a third ammonia gas stream from the ammonia source and to supply the first hydrogen-comprising gas stream to the first combustion chamber.

2. A gas turbine system as claimed in claim 1 further comprising a second cracker chamber arranged to receive a fourth ammonia gas stream from the ammonia source and to supply the second hydrogen-comprising gas stream to the second combustion chamber.

3. A gas turbine system as claimed in claim 2 wherein a temperature of at least one of said first cracker chamber and said second cracker chamber is regulated by mass control of a flow of a third exhaust gas stream from the second combustion chamber.

4. A gas turbine system as claimed in claim 1 further comprising a heat exchanger arranged to receive a third exhaust gas stream from the second combustion chamber.

5. A gas turbine system as claimed in claim 4 comprising a second turbine, which is a steam turbine operated by heat derived from said heat exchanger.

6. A method for extracting energy from ammonia, comprising:
   providing an oxygen-containing gas stream to a first combustion chamber;
   providing a first ammonia gas stream to the first combustion chamber;
   providing a first hydrogen-comprising gas stream to the first combustion chamber;
   performing a first combustion in the first combustion chamber that produces a first exhaust gas stream;
   providing said first exhaust gas stream from said first combustion chamber to a second combustion chamber;
   supplying a second ammonia gas stream to the second combustion chamber;
   supplying a second hydrogen-comprising gas stream to the second combustion chamber;
   performing a second combustion in the second combustion chamber with an enhanced equivalence ratio;
   generating the first hydrogen-comprising gas stream, which is supplied through the first combustion chamber, by cracking a third ammonia stream; and
   connecting a turbine to receive the first exhaust gas stream from the first combustion chamber and providing a second exhaust gas stream from the turbine to the second combustion chamber, thereby causing the turbine to generate a mechanical output.

7. A method for extracting energy from ammonia as claimed in claim 6 wherein said equivalence ratio is in a range between 1.0 and 1.2.

8. A method as claimed in claim 6 comprising generating the second hydrogen-comprising gas stream to the second combustion chamber by cracking a fourth ammonia stream.

9. A method as claimed in claim 8 comprising conducting said cracking the third ammonia stream or the fourth ammonia stream at an elevated temperature provided by a third exhaust gas stream from the second combustion chamber.

10. A method as claimed in claim 6 comprising removing waste heat from a third exhaust gas stream from the second combustion chamber, and recovering energy from said waste heat.

* * * * *